United States Patent
Viaud et al.

[11] Patent Number: 6,139,478
[45] Date of Patent: Oct. 31, 2000

[54] ARRANGEMENT FOR CLOSING A GAP BETWEEN A HARVESTING MACHINE ROLL AND A WALL FOR KEEPING FOREIGN MATTER AWAY FROM A BEARING SUPPORTING A SHAFT OF THE ROLL

[75] Inventors: Jean Viaud, Sarreguemines, France; Steffen Clauss, Dellfeld, Germany

[73] Assignee: Deere & Company, Moline, Ill.

[21] Appl. No.: 09/165,837

[22] Filed: Oct. 2, 1998

[30] Foreign Application Priority Data

Dec. 6, 1997 [FR] France .................. 197 54 234

[51] Int. Cl.[7] .................................................. F16C 13/00
[52] U.S. Cl. ...................................... 492/47; 492/16
[58] Field of Search ............................... 492/47, 15, 16, 492/57

[56] References Cited

U.S. PATENT DOCUMENTS

| | | | |
|---|---|---|---|
| 3,340,575 | 9/1967 | Sievers, Jr. ................ | 492/47 |
| 3,406,438 | 10/1968 | Reilly ...................... | 492/16 |
| 3,419,890 | 12/1968 | Justus ...................... | 492/16 |
| 3,793,689 | 2/1974 | Specth ...................... | 193/37 |
| 3,803,682 | 4/1974 | Stein ....................... | 198/791 |
| 3,894,323 | 7/1975 | Hamlen ..................... | 165/89 |
| 3,990,391 | 11/1976 | Singh ....................... | 399/339 |
| 4,852,230 | 8/1989 | Yu .......................... | 492/16 |
| 4,995,147 | 2/1991 | Ahrweiler et al. ........... | 492/16 |
| 5,193,450 | 3/1993 | Anderson ................... | 100/88 |
| 5,347,801 | 9/1994 | McIlwain ................... | 56/341 |
| 5,435,038 | 7/1995 | Sauers ..................... | 15/182 |
| 5,547,448 | 8/1996 | Robertson .................. | 492/16 |
| 5,603,206 | 2/1997 | Horchler, Jr. .............. | 56/341 |
| 5,928,121 | 7/1999 | Stotz et al. ............... | 492/7 |

FOREIGN PATENT DOCUMENTS

| | | |
|---|---|---|
| 0 330 975 A1 | 6/1989 | European Pat. Off. . |
| 3 320 715 | 12/1984 | Germany . |

Primary Examiner—David P. Bryant
Assistant Examiner—Marc W. Butler

[57] ABSTRACT

A large round baler includes a plurality of bale-forming rolls which each have opposite ends defined by stub shafts rotatably supported in respective bearings fixed to opposite side walls of the bale chamber. The rolls are each in the form of a hollow cylindrical drum and each stub shaft includes a flange having a diameter corresponding to the inside diameter of the drum and being secured to the drum at a location spaced inwardly from an end face of the drum. For preventing crop particles and juices from reaching each bearing, a ring-like seal body is fixed to the outer surface of the flange in concentric relationship to the stub shaft and to, and between, a cylindrical sealing surface of a collar that is fixed to the wall and a ring that is also fixed to the wall. The seal body has a plurality of radially outward projecting lips disposed very close to the sealing surface of the collar and a single radially inward projecting lip disposed very close to the ring.

8 Claims, 2 Drawing Sheets

ARRANGEMENT FOR CLOSING A GAP BETWEEN A HARVESTING MACHINE ROLL AND A WALL FOR KEEPING FOREIGN MATTER AWAY FROM A BEARING SUPPORTING A SHAFT OF THE ROLL

BACKGROUND OF THE INVENTION

The invention concerns an arrangement for closing a gap between two components that can move relative to each other, in particular between a rotating body and a stationary wall of a crop harvester, so as to prevent crop residue, including juices, from invading the space occupied by a bearing fixed to the wall and supporting a shaft of the rotating body.

EP-A1-0 330 975 discloses a large round baler with a multitude of rolls that extend between two side walls and that carry belts which, together with the side walls, define a baling chamber. Each roll includes a cylindrical body rotatably mounted on a fixed shaft extending axially within the body by means of a pair of roller bearings, with each bearing having an inner race fixed to the shaft and an outer race pressed into an end portion of the cylindrical body to a predetermined distance from an end face of the body. Between the end face of the roll and the adjacent bearing is a seal which, at its inner radius, is sealed against, and connected and for rotation with, the shaft; and which has its outer circumference spaced to form a small gap with the interior surface of the roll body. This circumference of the seal is provided with several circular grooves which are intended to accept short crop pieces that escape the baling chamber, resulting in a sort of fibrous seal which prevents dirt from reaching the bearing.

DE-A-3 320 715 discloses a large round baler of a known construction including a plurality of rolls which extend between and cooperate with a opposite side walls to define a baling chamber, the rolls each including a cylindrical body having a pair of stub shafts respectively projecting outwardly from opposite ends thereof and rotatably supported in a pair of roller bearings respectively fixed to the adjacent side walls. The stub shafts are each retained in two flanges fixed within the roll cylindrical body such that a predetermined space exists between the outer flange and the end of the body such that the roll body is open to the outside in a particular region. A collar having an axially extending, circular flange is attached to the adjacent wall of the baling chamber such that the flange is located in concentric relationship to and between the bearing and the body of the roll. This collar flange extends in axially overlapping relationship to the open end section of the roll body and creates a small radial gap between it and the body. This small gap is intended to keep dirt and crop residue away from the bearing.

The problem to be solved by the present invention resides in the fact that the prior art types of seals are not able to keep moisture away from the bearing, that is, the gap between the rotatable roll and wall is not closed adequately to protect the bearing.

SUMMARY OF THE INVENTION

According to the present invention there is provided an improved arrangement for excluding dirt and moisture from a bearing rotatably supporting a shaft fixed to, and projecting axially from an end of a harvester roll body.

An object of the invention is to provide an arrangement substantially sealing a first segment of a path defined between an end of a crop harvester roll body and a wall next to the roll body end and leading to a bearing fixed to the wall and rotatably supporting a shaft of the roll, the arrangement acting for preventing crop residue and moisture from gaining access to the bearing.

Yet another object of the invention is to provide an arrangement, as set forth in the immediately preceding object, which in addition to sealing the first segment of the path, also seals a second segment of the path.

Still another object of the invention is to provide an arrangement, as set forth in one or more of the preceding objects, wherein the arrangement results in the path including a closed cavity to which the bearing is exposed, and a grease fitting being located for introducing grease into the closed cavity.

Another object is to provide an arrangement, as set forth in the preceding objects, wherein the arrangement may be constructed without requiring close tolerances.

These and other objects will become apparent from a reading of the ensuing description together with the appended drawings.

DESCRIPTION OF THE EMBODIMENT

Figure 1:
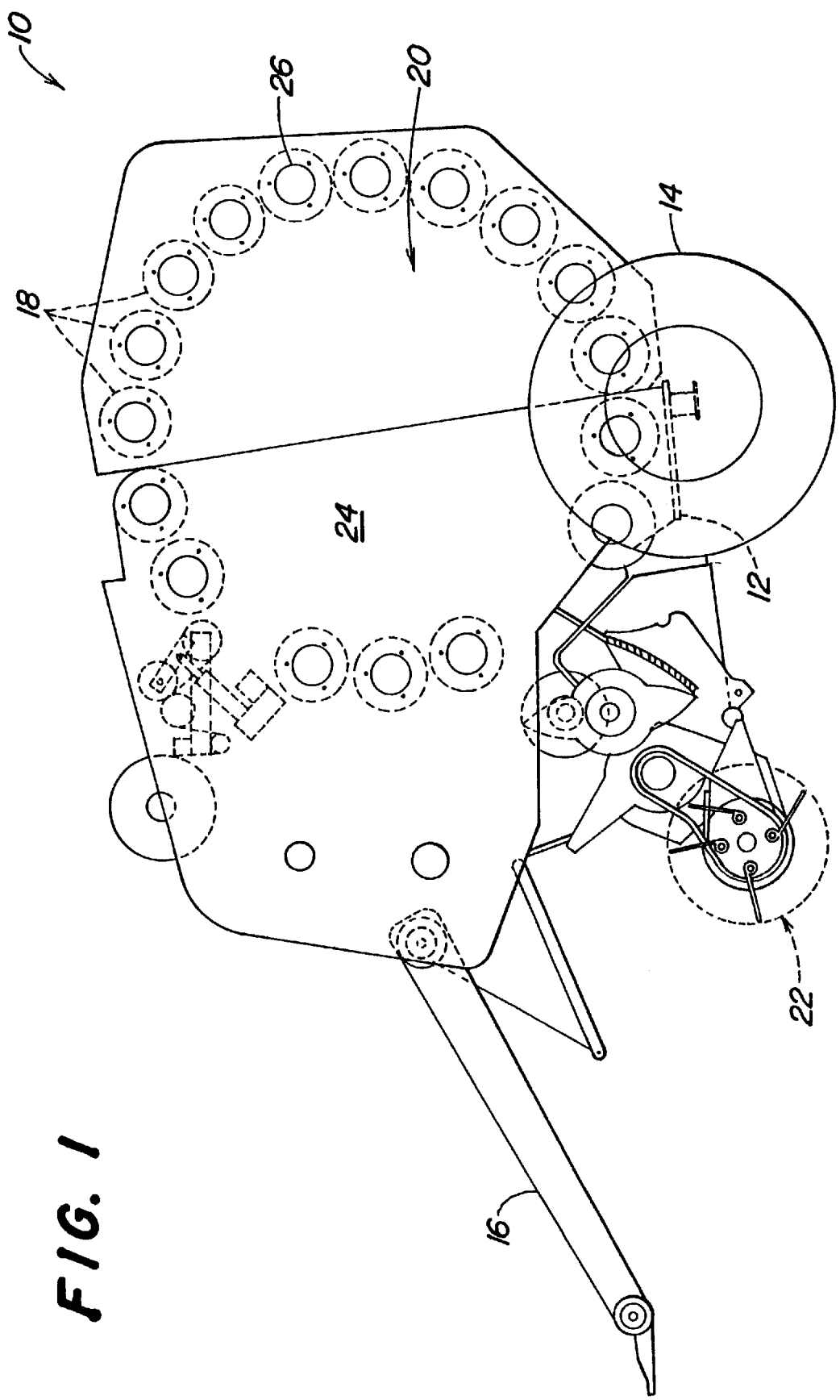
FIG. 1 is a left side elevational view of a large round baler incorporating several rotatable elements with which the present invention may be used.

A large round baler 10, shown in FIG. 1, includes a frame 12 that is supported on the ground on wheels 14 and to which a forwardly extending tongue 16 is fixed for attachment to a prime mover (not shown). The frame 12 supports a plurality of bale-forming rolls 18 which define the circumference of a baling chamber 20 of fixed size. Coupled to the front of the frame 12, at a location below the tongue 16, is a crop pickup 22 which operates to elevate a crop windrow and convey it to an inlet of the baling chamber 20. In addition to the rolls 18, the baling chamber 20 is defined by opposite side walls 24 in which a plurality of circular openings 26 are arranged nearly on a circle, it being noted that the rolls 18 and walls 24 are sometimes referred to as first and second components when describing the features of the present invention.

Instead of being associated with the round baler 10, the present invention could find application in a harvesting machine of another type such as a combine, forage harvester or processing mower, for example, these harvesting machines all having rotatable parts, such as compression or conditioning rolls and the like, involved in processing the crop. This crop may be grass or hay, for example, which exhibits a more or less high moisture content. In the production of so-called silage, in particular, grass or other forage is taken up in nearly wet condition. As a result, processing of the crop causes cause juices to be excreted from the crop whereby bearings supporting these parts may be subjected to contact with such crop juices. In the case of baler 10, compression during the baling process results in the moisture forced out of the crop coming into contact with all regions close to the baling chamber 20.

Figure 2:
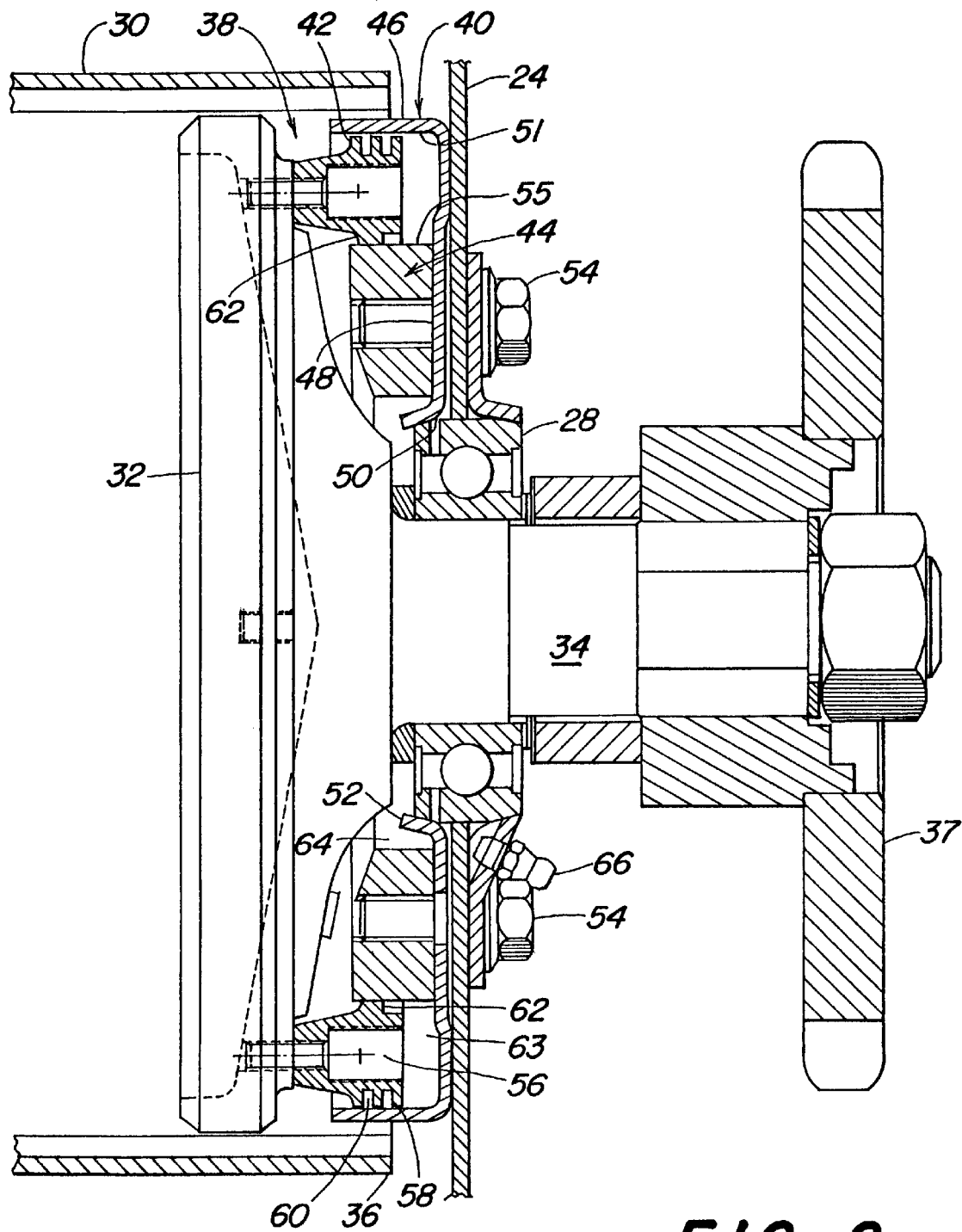
FIG. 2 is an enlarged sectional view of an end portion of a baler roll equipped with an arrangement for sealing the roll shaft support bearing.

Referring now also to FIG. 2, it can be seen that the first components 18 are each in the form of a hollow, exteriorly ribbed drum or cylinder 30 having each of its opposite ends (only one end shown) rotatably supported by a roller bearing 28 mounted to a respective side wall 24 within a respective opening 26. Depending on the configuration of the baling chamber 20, the rolls 18 may be driven or non-driven. In any event, since the rolls 18 define the periphery of the baling chamber 20, they are constantly exposed to the moist crop that is being baled.

Located within each end of the drum 30 is a flange 32 provided with a cylindrical rim having an outside diameter essentially equal to the inside diameter of the drum so that the drum and flange can be connected to each other, for example, by welding or bolting, in order to form a connection whereby the drum and flange rotate in unison. Formed integrally with and extending axially from each flange 32 is a stub shaft 34 that projects outwardly beyond an adjacent end face 36 of the drum, the shaft 34 being rotatably supported by the adjacent bearing 28. As illustrated in FIG. 2, the roll 18 is driven and for that purpose a gear 37 is shown secured to an outer end of the shaft 34 at a location outboard of the side wall 24. It should be noted that the shaft 34 could be retained rigidly in the wall 24 and that the bearing 28 could be located between the shaft 34 and the flange 32, which, however, presupposes that the first component 18 is not driven at that location. Furthermore, the configuration or even the presence of the flange 32 and the attachment of the bearing 28 in a wall does not matter, only a region that is to be sealed off is required, for example, a rotating bearing or a rotating or pivoting component.

For sealing of the bearing 28 with respect to the gap between the first and second components, that is the roll 18 and wall 24, an arrangement 38 is provided that includes a collar 40, a sealing body 42 and, in the preferred embodiment, also a ring 44, where the latter is not absolutely required. In the preferred embodiment, the collar 40 is formed from sheet metal drawn into a pot or bowl shape having a cylindrical wall 46 joined to a substantially flat base 48. Obviously the collar 40 could be a plastic part, but, in either case, it can be manufactured with close production tolerances. A circular hole 50 is located centrally in the base 48, with the hole 50 being bordered by an angled or flared wall portion 52. The collar base 48 defines an attachment section having its outer surface placed against and secured, as by bolts 54, to the inside of the wall 24, with the wall portion 52 encircling and being in engagement with an outer diameter portion of the bearing 28. The cylindrical wall 46 has a diameter which is slightly less than that of the rim of the flange 32, the wall 46 being disposed in concentric relationship to the shaft 34 and projecting axially in perpendicular relationship to the wall 24 from the base 48 to a location within the end of the hollow drum 30 such that it overlaps the drum end face 36.

The wall 46 defines a radially inwardly facing sealing surface 51; and the ring 44 is fixed, as by the bolts 54 which are received in threaded holes provided in the ring, to an inner surface of the collar base 48 such that an outwardly facing, cylindrical sealing surface 55 is located in spaced concentric relationship to the sealing surface 51.

The sealing body 42 is fixed for rotation with the roll 18 by means of bolts 56 that are screwed into threaded bores provided in the flange 32. On the other hand, the attachment to the flange 32 could also be performed by material locking, positive locking or friction locking means. The sealing body 42 is constructed of a wear resistant and acid proof plastic configured as a sealing ring and is positioned so that it extends axially from the flange to a location between the respective sealing surfaces 51 and 55 of the collar wall 46 and ring 44. The sealing body 46 is provided on its radially outer side with a sealing surface defined by a plurality of sealing lips 58, in this case three in number, which define recesses 60 between them and cooperate with the surface 51 to define a first sealed section of the path leading from the gap, defined between the wall 24 and roll end surface 36, to the bearing 28. The sealing body 46 is provided on its radially inner side with a single sealing lip 62 which cooperates with the sealing surface 55 to define a second sealed section of the path leading from the aforementioned gap to the bearing 28. These lips 58 and 62 have a certain flexibility and can deflect accordingly in case of deformations. The sealing body 42 is spaced in the axial direction from the collar base 48 and cooperates with the ring 44 and sealing surface 46 to define an annular chamber 63.

In the preferred embodiment, the sealing lips 58 are not in contact with the sealing surface 51 of the collar wall 46, but end just short of this surface so as to form a gap of less than 1 mm. In this way, an excessive frictional contact with the corresponding development of heat is avoided. In addition, this permits manufacturing with wider tolerances, which reduces manufacturing costs. In this construction, the sealing effect is obtained by an accumulation of fibrous dirt in the form of stems, leaves and chaff in the recesses 60 that forms itself into a compact sealing ring which closes the remaining gap, that is, prevents the intrusion of further dirt or moisture.

Alternatively, the sealing lips 58 could also extend up to the sealing surface 51 or a separate seal could be provided in the recesses 60. It would also be possible to expand the sealing lips 58 and the recesses 60 into a labyrinth.

In any case, the sealing lips 58 form an obstacle that separates a first chamber outside the sealing body 42, i.e., the annular space that is in communication with the gap between the wall 24 and roll end face 36, from the annular chamber 63, and thereby protects against moisture every location radially inwardly of the sealing body 42, which in this embodiment includes the bearing 28. In other words, the closed chamber 63 acts to hold back any moisture or dirt that has penetrated that far.

In addition to the chamber 63 defined by the collar 40, sealing body 42 and ring 44, it can be seen that between the ring 44, the sealing lip 62, the side of the flange 32 facing axially outward and the side of the bearing 28 facing inward, that an inner space or third chamber 64 is created. The space 64 is sufficiently large to accommodate the angled edge 52 and the associated bearing 28 and may be filled with grease to lubricate and shield the bearing 28. Specifically, grease may be forced from the outside through a grease fitting 66 so as to first fill the bearing 28 and then accumulate in this third chamber 64 to thereby hold moisture and dirt away from the bearing 28 while providing lubrication for the bearing. However, it is not an absolute requirement that this third chamber be filled with grease.

What is claimed is:

1. In combination with a roll in the form of a hollow cylinder having a shaft projecting axially from one end thereof and being received in a bearing supported within one of said cylinder and a fixed side wall located exteriorly of, and having an inner surface spaced axially from, said one end of said cylinder so as to define a gap, an arrangement for preventing moisture and dirt from reaching the bearing from said gap between the wall and the cylinder, comprising: a collar fixed to said inner surface of said side wall and including a first cylindrical sealing surface extending axially into said cylinder from said wall and arranged concentrically to said shaft; and a sealing body connected to said roll so as to rotate therewith and having a second cylindrical sealing surface including a plurality of annular, axially spaced sealing lips disposed at least in close, confronting, sealing relationship to, said first cylindrical sealing surface of said collar.

2. The combination defined in claim 1 wherein said second cylindrical sealing surface includes at least three annular sealing lips.

3. The combination defined in claim 1 wherein said first cylindrical sealing surface faces radially inwardly; said combination further including a ring fixed to said wall in concentric relationship to and radially inwardly of said sealing body; and said sealing body having a radially inwardly directed sealing lip, located on an opposite side of said sealing body from said second sealing surface, and disposed in sealing relationship to said ring.

4. The combination defined in claim 1 wherein said bearing is mounted within said wall and said collar, ring, flange and bearing cooperate to define a closed chamber; and a grease fitting being provided for introducing lubricant into said chamber for lubricating said bearing and also aiding in excluding moisture from said bearing.

5. The combination defined in claim 4 wherein said sealing body is constructed of a wear resistant plastic material.

6. The combination defined in claim 1 wherein said collar, in addition to said axially extending first cylindrical surface includes a radially extending attachment section having a mounting surface fixed against said wall.

7. The combination defined in claim 1 wherein an axially inward portion of said attachment section defines a flared wall portion engaged with an inner portion of said bearing.

8. The combination defined in claim 7 wherein a flange is fixed to said hollow cylinder at a location spaced inwardly from said one end of said cylinder; said shaft being a stub shaft having an end joined to said flange; said sealing body being fixed to said flange; and said bearing being mounted within said wall.

* * * * *